UNITED STATES PATENT OFFICE.

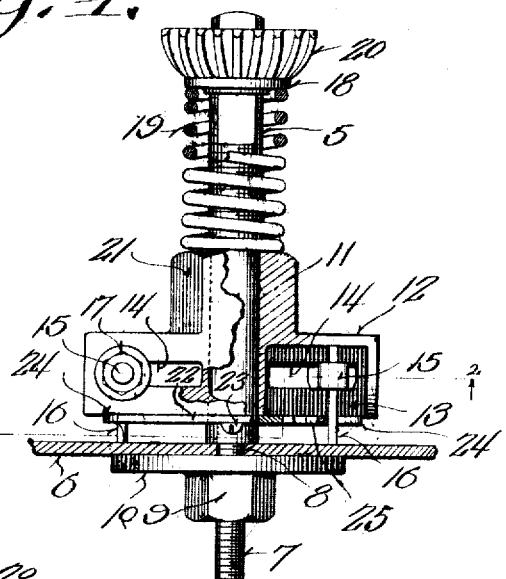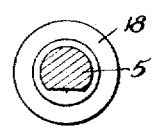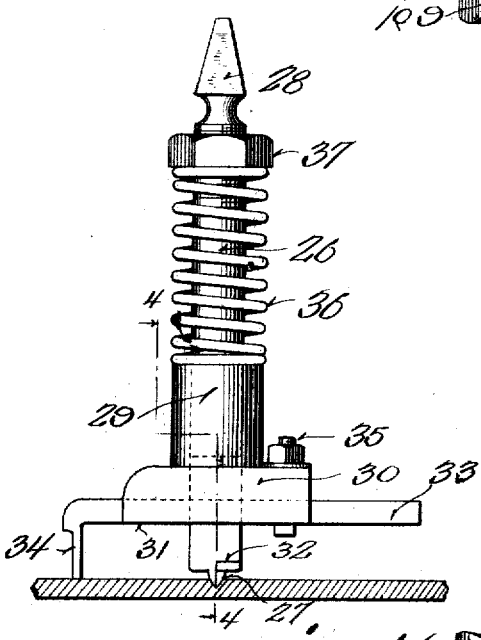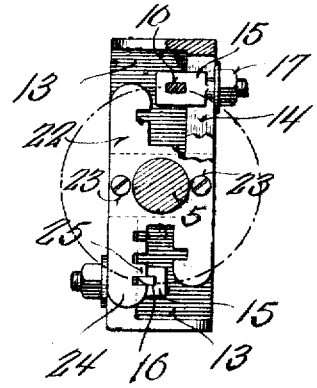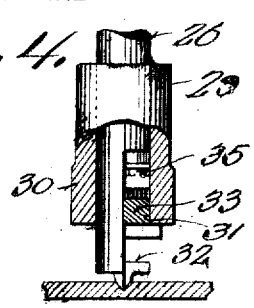

CHRISTOPHER BACH, JR., OF MILWAUKEE, WISCONSIN.

CUTTING-TOOL.

1,270,254.  Specification of Letters Patent.  Patented June 25, 1918.

Application filed May 3, 1916. Serial No. 95,029.

*To all whom it may concern:*

Be it known that I, CHRISTOPHER BACH, Jr., a citizen of the United States, and resident of Milwaukee, in the county of Milwaukee and State of Wisconsin, have invented certain new and useful Improvements in Cutting-Tools; and I do hereby declare that the following is a full, clear, and exact description thereof.

The present invention relates to new and useful improvements in tools for cutting circular openings in work material and relates more particularly to that type of cutting tool wherein the cutter head is rotatable with respect to the work material.

Under various circumstances it is often necessary to provide circular openings in various articles under such conditions as to render the use of conventional lathes or other cutting machines impractical.

It is therefore the object of the present invention to provide a tool for cutting circular openings in material which is of such compact and portable nature that it may be carried about readily in a work kit.

It is further an object to provide such a portable or as it may be termed, emergency tool, which is capable of ready operation, and in this connection it is more specifically an object to provide a cutting tool of this nature which may be securely fastened to the work material and which may be actuated in its cutting operation by rotating the cutter head, as by a wrench.

A still further object resides in the provision, in a sweep cutting tool, of a spring feed for the cutter head, whereby it is automatically fed in a most simple manner during the cutting operation, and further whereby a too rapid feeding with respect to the hardness of material, is obviated, to thus prevent possible breakage of the knife members.

It is still further an object to provide such a tool which is of a relatively simple and compact structure to promote durability in use and convenience in manipulation.

With the above and other objects and advantages in view the invention resides more particularly in the novel combination, arrangement and formation of parts more particularly hereinafter described and more particularly pointed out in the appended claims.

In the drawings:

Figure 1 is a side elevational view of a cutting tool constructed in accordance with the present invention, with portions thereof broken away to more clearly disclose the structure.

Fig. 2 is a transverse sectional view through the tool on the line 2—2 of Fig. 1.

Fig. 3 is an elevational view of a modified form of the invention more particularly adapted for cutting soft material such as fiber board.

Fig. 4 is a transverse sectional view through this modified structure on the line 4—4 of Fig. 3.

Fig. 5 is a detail horizontal sectional view through the upper end of Fig. 1, showing the means for preventing relative rotation of the spring engaging washer of the shaft.

Referring now more particularly to Figs. 1 and 2 of the drawings, the improved tool comprises a body shaft 5 which is adapted for securement to a sheet of work material 6 by a reduced threaded extension 7 at one end passed through an opening 8 formed in the work material and having threaded thereon a nut 9 provided at its inner end with a peripheral flange 10 seating the work material. Thus the work material is clamped between the shoulder formed at the inner end of the reduced shaft extension and the nut, and the body shaft is fixedly secured to the work material. Slidable on this body shaft is a cutter head including a sleeve 11 intermediately provided with oppositely extending lateral arms 12 which are provided at opposite sides with flanges 13 extending toward the attaching end of the body shaft, and provided with longitudinal slots 14. Slidably passed through these slots are holding bolts 15 having head portions disposed at the inner sides of the flanges and apertured to receive the knife bars 16. the ends of the bolts outwardly of the flanges being threaded for the reception of clamping nuts 17 whereby the knife bars may be clamped against the inner faces of the flanges.

Slidably mounted on the end of the body shaft farthest from the cutter head by reason of a longitudinal flattening of one side of the shaft is a washer 18, and disposed between the washer and the cutter head sleeve is an expansile spring 19 which is held under desired tension by an adjusting nut 20 threaded on the just specified end of the shaft to bear against the washer 18. Thus the cutter head is resiliently urged to operative engagement with the work material, and the spring comprises a means for feeding the cutter head into the material as the cutting operation proceeds. For rotating the cutter head, the inner portion of the sleeve 11 is provided with a plurality of flat faces 21 engageable by a wrench or other tool.

It is noted that the knife bars 16 engage against the bottom faces of the arms 12, and thus a firm seating of the knife-bars is procured. To provide a positive means for holding the knife bars in definite position relative to the axis of the tool, a gage-plate 22 is detachably secured on the inner end of the cutter head sleeve, as by means of the screws 23, the body shaft passing through this plate, and each side of the plate is provided with arms 24 extending parallel to the arms 12 of the sleeve and adapted to rest against the flanges 13 of said arms. Each of the arms is provided with series of side projections 25 which are adapted to project inwardly of a supporting flange when disposed there-adjacent to define receiving recesses for the knife-bars, the projections being preferably spaced in such manner as to provide for cutting openings of such sizes as to receive standard size pipes. The projections of oppositely disposed arms 24 are arranged in staggered relation whereby upon turning the gage plate on the sleeve to selectively position certain arms adjacent to the flanges 22, a relatively fine degree of adjustment may be procured.

In the operation of the present machine, the hole 8 which receives the reduced extension of the body shaft is formed in the work material as by a brace and bit. The shaft is then secured to the work material by insertion of its reduced end in this opening, the cutter head is then positioned on the body shaft and the feed screw is positioned on the shaft and placed under such tension by the nut 20 as to provide for a proper feeding engagement of the cutter head with the work material. The cutter head is then rotated and inasmuch as the entire tool is attached to the work material, the operation of cutting is greatly facilitated.

The above described structure is particularly intended for cutting metallic or other very hard material, and the present invention finds a particular application in cutting holes in meter boxes to receive conduit pipes at various desired points.

Figs. 3 and 4 illustrate a somewhat modified form of the invention adapted for cutting softer material and more particularly fiber board. In this structure there is provided a body shaft 26 which is provided at one end with a spur 27 adapted to engage in the work material to hold the shaft centered with respect to the operation of the cutting member; the other end of the shaft is provided with a plurality of square faces 28 and adapted for association with a brace tool or other rotating means. Slidable on the shaft is a sleeve 29 enlarged at one end to form a cutter head 30. The outer face of this head is provided with a transverse groove 31 disposed laterally of the axis of the shaft and intersecting the shaft, which has its side cut away as at 32. Disposed in this groove and extended across the cutaway portion of the shaft is a transverse shank 33 of knife bar, which is laterally directed at one end at 34 to form the knife. This shank is adjustably secured in the groove by a bolt 35 passed transversely through the head 30. The cutter head is substantially splined on the body shaft by the above described arrangement and thus upon rotation of the body shaft, the cutter head will be rotated and is urged to operative cutting engagement with the work material by a spring 36 disposed on the shaft between the sleeve 27 and an adjusting nut 37 threaded on the shaft.

While the present invention has been more particularly described as embodied in a portable cutting tool, it will be appreciated that various features of the invention may find valuable application in cutting mechanisms not necessarily of portable type and I am therefore to be limited in the scope of my invention, only by the appended claims.

A general advantage of the present invention which is not necessarily associated with the portable embodiment of the tool is the spring feed arrangement for the cutter head, whereby an exceedingly simple automatic feed is procured and further whereby a yielding feed is procured to permit the knife bars to yield upon encountering relatively hard portions of the work material, to thus prevent breakage of the knife bars.

I claim:

1. A cutting tool comprising a body shaft, a cutter head carried thereby and longitudinally movable thereon, an expansile spring on the body shaft and engaging the cutter head, an adjustable holding member for the spring carried by the shaft and means for revolving the cutter head.

2. A cutting tool comprising a body shaft, means for securing said body shaft to work material, a cutter head rotatably carried by the body shaft and having longitudinal movement thereon and a feed spring carried by the body shaft and engageable with the cutter head, and means for revolving the cutter head.

3. A cutting tool comprising a body shaft, a cutter head rotatably carried by the shaft and having longitudinal movement thereon, a reduced extension on one end of the shaft, a clamping nut threaded on said reduced extension, a feed spring carried by the shaft and engageable with the cutter head at its end farthest from the said reduced extension of the shaft, and means for rotating the cutter head.

4. A cutting tool comprising a body shaft, a cutter head rotatably mounted thereon and having longitudinal movement with respect thereto, means at one end of the shaft for securing it to work material, a washer slidable on the other end of the shaft, means for preventing relative rotation of the washer, an expansile spring disposed between the washer and the cutter head, and a nut threaded on the shaft to engage said washer.

5. A cutting tool comprising a body shaft, means at one end of said shaft for securing it to work material, a cutter head including a sleeve rotatably mounted on the shaft and having longitudinal movement thereon, oppositely extending arms projecting from the sleeve, flanges projecting from the arms toward the specified end of the body shaft, apertured holding bolts passed through the flanges, tool bars passed through the apertures of the holding bars to engage against the said arms, and a feed spring carried by the body shaft and engageable with the cutter head.

6. A cutting tool comprising a body shaft, means at one end of said shaft for securing it to work material; a cutter head including a sleeve rotatably mounted on the shaft and having longitudinal movement thereon, oppositely extending arms projecting from the sleeve, flanges projecting from the arms toward the specified end of the body shaft, apertured holding bolts slidably passed through the flanges, a gage plate reversibly secured on the end of the sleeve adjacent the flanges, pairs of spaced arms at the ends of the plate adapted to be selectively positioned in alinement with the flanges, projections at the inner sides of the arms of the plate defining tool bar recesses and tool bars selectively disposed in certain recesses and passed through the apertures of the holding bolts to engage against the first named arms and a feed spring carried by the body shaft and engageable with the cutter head.

7. A cutting tool comprising a shaft having a threaded end, a cutting member longitudinally slidable and rotatable on the shaft, a shoulder on the threaded end of the shaft, and a nut threaded on said end of the shaft for clamping work material between said nut and the shoulder.

8. A cutting tool comprising a body shaft, a rotatable cutter head including a sleeve longitudinally slidable on the shaft, an arm extending laterally from the sleeve, a flange extending from the sleeve, a tool holding member carried by the flange, a tool in said holding member and disposed below the arm for engagement with the under side thereof, whereby to limit movement of said tool in one direction, and means for rotating the cutter head.

9. A cutting tool comprising a body shaft, a rotatable cutter head including a sleeve longitudinally slidable on the shaft, an arm extending laterally from the sleeve, a flange extending from the sleeve and having an elongated slot therein, a tool holding member disposed in the slot and adjustably carried by the flange, a tool in said holding member and disposed below the arm for engagement with the under side thereof, whereby to limit movement of said tool in one direction, and means for rotating the cutter head.

10. A cutting tool comprising a body shaft, a rotatable cutter head including a sleeve longitudinally slidable on the shaft, a flange extending laterally from the sleeve, a tool holding member adjustably carried by the flange, a gage plate secured to the sleeve adjacent the flange and having a plurality of tool receiving recesses adapted to have the tool holding member selectively alined therewith, and a tool carried by the holding member and disposed in any one of said recesses.

11. A cutting tool comprising a body shaft, a rotatable cutter head including a sleeve longitudinally slidable on the shaft, a flange extending laterally from the sleeve, a tool holding member adjustably carried by the flange, a gage plate reversibly secured to the sleeve, a pair of spaced arms extending from the gage plate and adapted to be selectively engaged with said flange, each of said arms having a plurality of tool receiving recesses, said recesses being adapted to have the tool holding member selectively alined therewith, and a tool carried by the holding member and disposed in any one of said recesses in either arm of the gage plate.

In testimony that I claim the foregoing I have hereunto set my hand at Milwaukee, in the county of Milwaukee and State of Wisconsin, in the presence of two witnesses.

CHRISTOPHER BACH, Jr.

Witnesses:
GEORGE W. YOUNG,
M. E. DOWNEY.